(12) United States Patent
Lee

(10) Patent No.: US 10,820,645 B2
(45) Date of Patent: Nov. 3, 2020

(54) BELT LOOP FOR WOMEN'S CLOTHES AND METHOD FOR SEWING SAME

(71) Applicant: Ki Sun Lee, Seoul (KR)

(72) Inventor: Ki Sun Lee, Seoul (KR)

( * ) Notice: Subject to any disclaimer, the term of this patent is extended or adjusted under 35 U.S.C. 154(b) by 0 days.

(21) Appl. No.: 16/464,528

(22) Filed: May 28, 2019

(65) Prior Publication Data

US 2020/0154805 A1    May 21, 2020

Related U.S. Application Data

(63) Continuation-in-part of application No. PCT/KR2018/000156, filed on Jan. 4, 2018.

(30) Foreign Application Priority Data

Jan. 19, 2017    (KR) .................. 10-2017-0009011

(51) Int. Cl.
*A47F 9/00* (2006.01)
*D05B 35/06* (2006.01)
*A41F 9/00* (2006.01)

(52) U.S. Cl.
CPC ............ *A41F 9/007* (2013.01); *D05B 35/068* (2013.01); *D05D 2303/20* (2013.01)

(58) Field of Classification Search
CPC .......... A41F 9/007; D02G 1/028; D02G 3/44; D05B 35/068; D05B 2303/20
See application file for complete search history.

(56) References Cited

U.S. PATENT DOCUMENTS

| | | | | |
|---|---|---|---|---|
| 1,877,697 A | * | 9/1932 | Schlusselberg | A41F 9/007 2/93 |
| 2,189,413 A | * | 2/1940 | Auerbach | A41F 9/007 2/93 |
| 3,271,782 A | * | 9/1966 | Mallett | A41F 9/007 2/236 |
| 3,271,783 A | * | 9/1966 | Mallett | A41F 9/007 2/236 |
| 3,789,431 A | * | 2/1974 | Rand | A41F 9/007 2/236 |
| 5,586,969 A | * | 12/1996 | Yewer, Jr. | A61F 5/028 128/101.1 |
| 5,632,071 A | | 5/1997 | Maunder | |

(Continued)

FOREIGN PATENT DOCUMENTS

| | | |
|---|---|---|
| JP | 55-135005 U | 9/1980 |
| KR | 20-0395453 Y1 | 9/2005 |
| KR | 10-1773043 B1 | 9/2017 |

*Primary Examiner* — Robert Sandy
*Assistant Examiner* — Louis A Mercado
(74) *Attorney, Agent, or Firm* — Novick, Kim & Lee, PLLC; Jae Youn Kim

(57) ABSTRACT

A belt loop for women's clothes and a method for sewing the same are proposed, wherein a belt loop has a structure in which both ends of the loop including multi-strand twisted yarns are connected to an integral piece or separate pieces of cloth for sewing, so that, when the front and back parts or the top and bottom parts of a garment are sewn with each other in a garment manufacturing process, the piece(s) of cloth for sewing can be sewn together therewith, and thus the belt loop can be formed simultaneously with the garment manufacturing process, which leads to process simplification and garment manufacturing cost reduction.

7 Claims, 11 Drawing Sheets

(56) References Cited

U.S. PATENT DOCUMENTS

| | | | | |
|---|---|---|---|---|
| 5,806,100 | A | | 9/1998 | De Scandiffio |
| 5,920,964 | A | * | 7/1999 | Malzahn ................. A41F 9/002 24/163 K |
| 2009/0113604 | A1 | * | 5/2009 | Ells ........................ A41F 9/002 2/311 |
| 2009/0151052 | A1 | * | 6/2009 | Masutani ............... A44C 25/00 2/244 |
| 2010/0162468 | A1 | * | 7/2010 | Hanson .................. A41F 9/002 2/338 |
| 2014/0317832 | A1 | * | 10/2014 | Allen ..................... A41F 9/007 2/236 |
| 2018/0027910 | A1 | * | 2/2018 | Williams ................ A41F 9/007 |
| 2019/0365002 | A1 | * | 12/2019 | Stevens .................. A41F 9/007 |

* cited by examiner

BELT LOOP FOR WOMEN'S CLOTHES AND METHOD FOR SEWING SAME

TECHNICAL FIELD

The present invention relates to a belt loop for women's clothes, and more particularly to a belt loop for women's clothes in which a piece of cloth for sewing including a loop is sewn on a seam allowance of clothes in a clothes manufacturing process so as to achieve process simplification, and a method for sewing the same.

BACKGROUND ART

In general, belts means straps or bands which are fastened around the waist regardless of sex, and are usually used to hold up pants or adjust a coat.

Such belts may be used to close collars of a front part of women's clothes, such as a coat, a blouse, a one-piece dress, etc., or to emphasize beauty of a waistline.

Meanwhile, in order to use a belt, belt loops into which the belt is inserted are formed on women's clothes, and among belt loops formed on women's clothes, belt loops formed of fine yarn are generally used so as not to hinder beauty of the clothes.

As general belt loop for women's clothes, upper and lower ends of a belt loop 10 formed of yarn are sewn on a side line of women's clothes, i.e., a joint between a front part and a back part of a garment, as shown in FIG. 1.

However, the above-described conventional belt loop is manually sewn on the position of a waistline of the garment by a sewer with a needle, after manufacture of the garment has been completed, thus causing inconvenience in separate manual tasks during a clothes manufacturing process.

Further, the conventional belt loop is just formed of yarn and may thus be easily cut, or, when external force is applied to the belt loop, the force is applied to the ends of the belt loop sewn on the garment and may thus cause damage to the garment, such as tearing of a sewn region.

DISCLOSURE

Technical Problem

Therefore, the present invention has been made in view of the above problems, and it is an object of the present invention to provide a belt loop for women's clothes having a structure in which both ends of a loop formed of twisted yarn acquired by twisting multiple strands of yarn are connected to an integral piece of cloth for sewing or separate pieces of cloth for sewing, so that, when a front part and a back part or an upper part and a lower part of clothes are sewn with each other in a clothes manufacturing process, the piece(s) of cloth for sewing may be sewn on a seam allowance to form the belt loop and thus the belt loop may be formed simultaneously with the clothes manufacturing process without separate manual tasks, so as to achieve process simplification and clothes manufacturing cost reduction, and a method for manufacturing the same.

It is another object of the present invention to provide a belt loop for women's clothes in which a loop is formed by twisting multiple strands of yarn so as to improve durability of the loop, and damage to a fabric of clothes caused by formation of a conventional belt loop is prevented, and a method for manufacturing the same.

Technical Solution

In accordance with an aspect of the present invention, the above and other objects can be accomplished by the provision of a belt loop for women's clothes including a piece of cloth for sewing sewn on a seam allowance simultaneously with backstitching of a front part and a back part of clothes, and a loop provided with both ends connected to both sides of the piece of cloth for sewing by sewing.

The piece of cloth for sewing may be formed of a fiber material so as not to be torn during sewing, and the loop may be formed of twisted yarn acquired by twisting at least two strands of yarn.

In accordance with another aspect of the present invention, there is provided a method for sewing a belt loop for women's clothes having a piece of cloth for sewing formed of a fiber material and sewn simultaneously with sewing of clothes, and a loop provided with both ends connected to both sides of the piece of cloth for sewing and formed of twisted yarn acquired by twisting at least two strands of yarn, the method including performing temporary fixing by performing primary backstitching of a width-directional middle part of the piece of cloth for sewing in a length direction, on a seam allowance of any one of a front part and a back part of the clothes such that the loop alone is exposed to the outside the clothes based on a seam allowance line and the piece of cloth for sewing is located at the seam allowance inside the clothes based on the seam allowance line, performing main sewing by performing secondary backstitching along the seam allowance line under the condition that the front part and the back part of the clothes are overlapped such that outer surfaces thereof face each other, so as not to expose the piece of cloth for sewing to the outside of the clothes from a secondary backstitching line, and performing withdrawal of the loop by turning the clothes, in which the front part and the back part are backstitched, inside out so as to withdraw the loop to the outside.

Advantageous Effects

In a belt loop for women's clothes and a method for sewing the same in accordance with the present invention, when a front part and a back part or an upper part and a lower part of clothes are sewn with each other, piece(s) of cloth for sewing to which a loop is connected may be sewn together therewith, thus providing convenience in manufacturing clothes, such as process simplification, and reducing clothes manufacturing costs.

Further, the loop exposed to the outside is formed by twisting multiple strands of yarn and thus durability of the loop may be further improved, and, when external force is applied to the belt loop during formation of the belt loop in clothes, the force is distributed throughout the piece of cloth for sewing and thus damage to a fabric of the clothes may be prevented.

BEST MODE

The terms used in the following description and claims are not interpreted as being limited to usual meanings or dictionary meanings, and should be interpreted to have meanings and concepts coinciding with the technical scope of the invention based on the principle that an inventor may properly define concepts of terms to describe their own invention in the best mode.

Therefore, in the following description, a variety of specific elements such as constituent elements are shown. The description of such elements has been made only for a better understanding of the present invention. Those skilled in the art will appreciate that various modifications, additions, and substitutions to the specific elements are possible, without departing from the scope and spirit of the invention as disclosed in the accompanying claims.

Reference will now be made in detail to the preferred embodiments of the present invention, examples of which are illustrated in the accompanying drawings.

Figure 1:
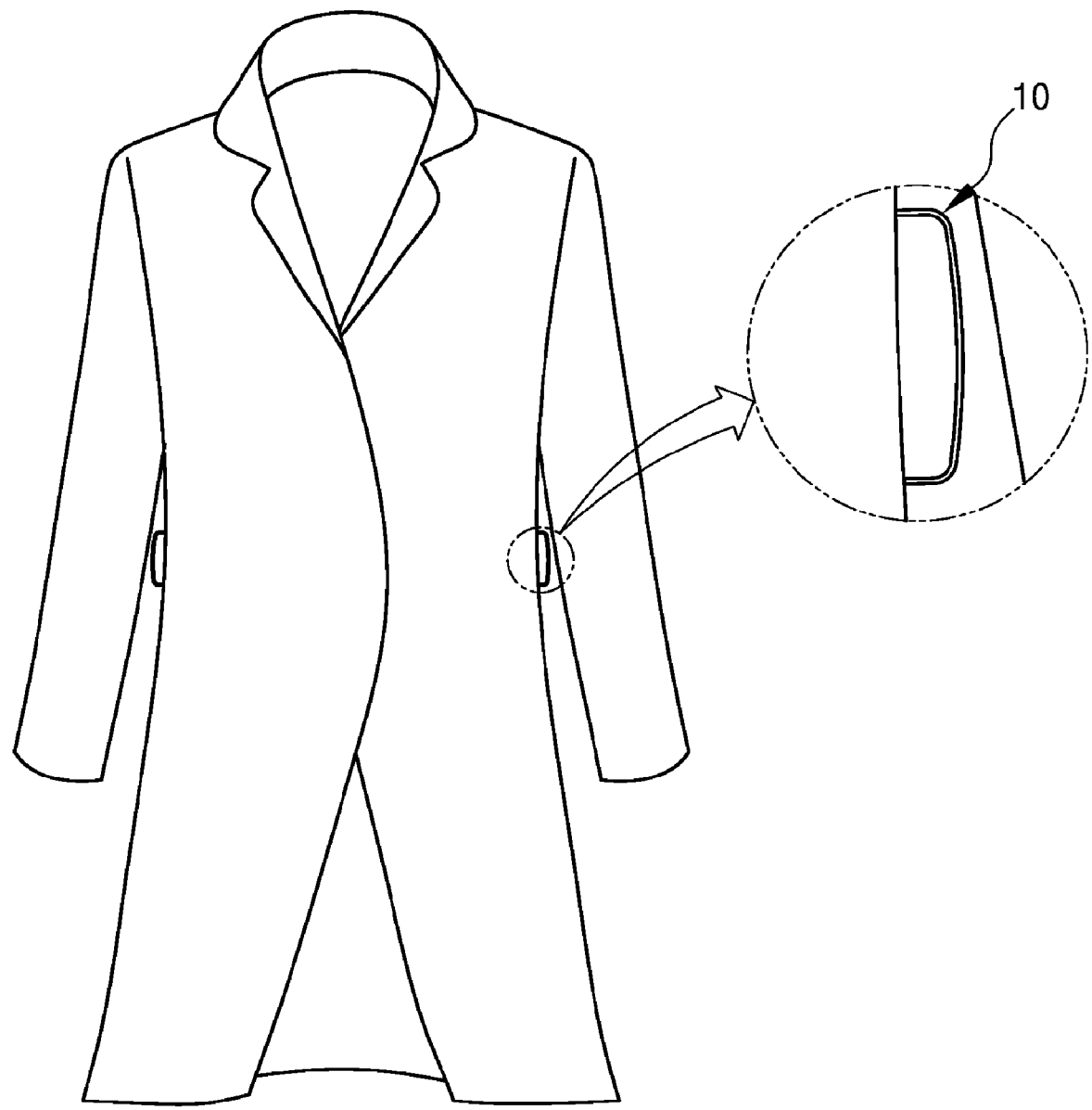
FIG. 1 is a schematic view illustrating a state in which conventional belt loops are sewn on clothes.
Figure 2:
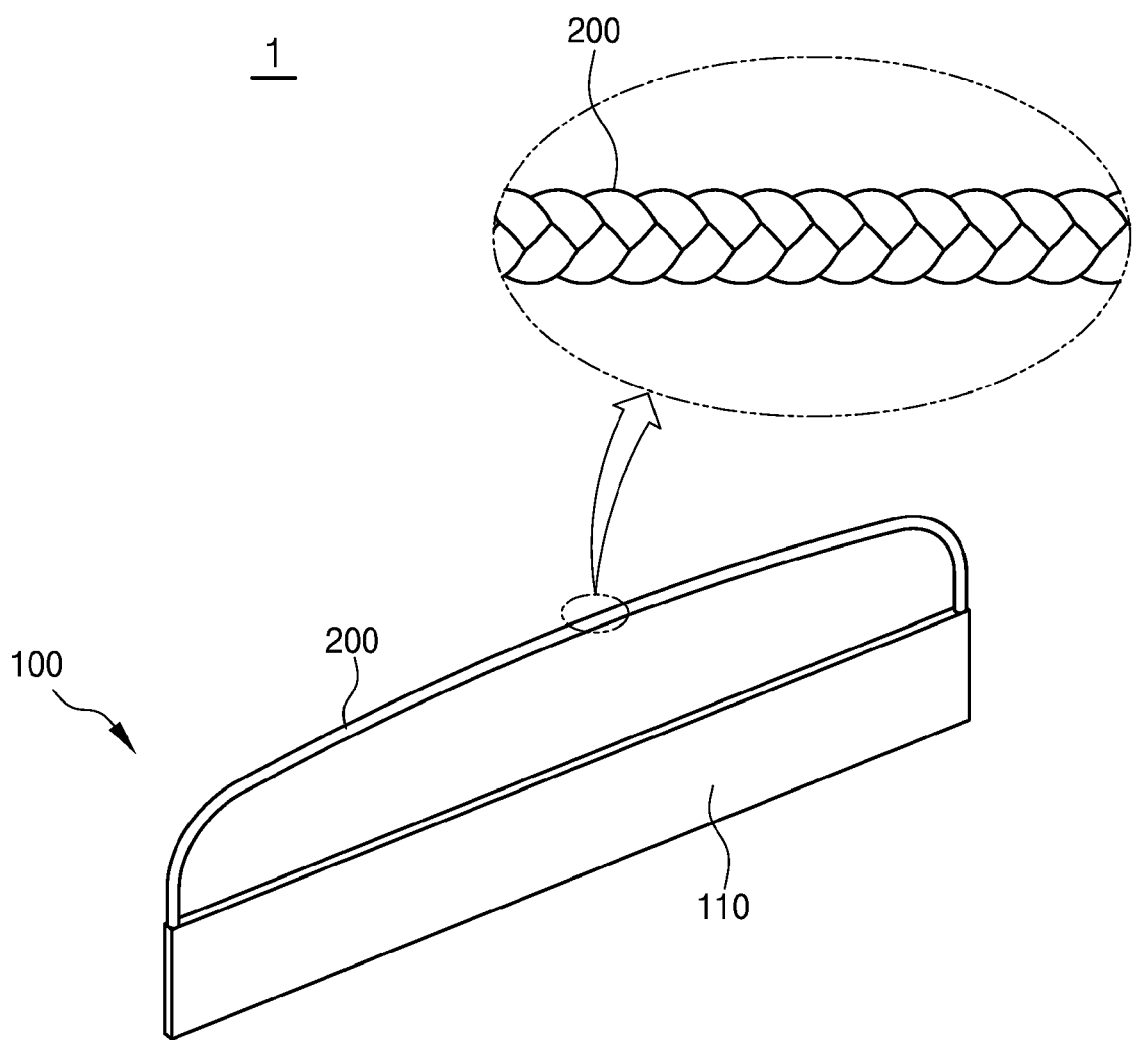
FIG. 2 is a perspective view of a belt loop for women's clothes in accordance with a first embodiment of the present invention.
Figure 3:
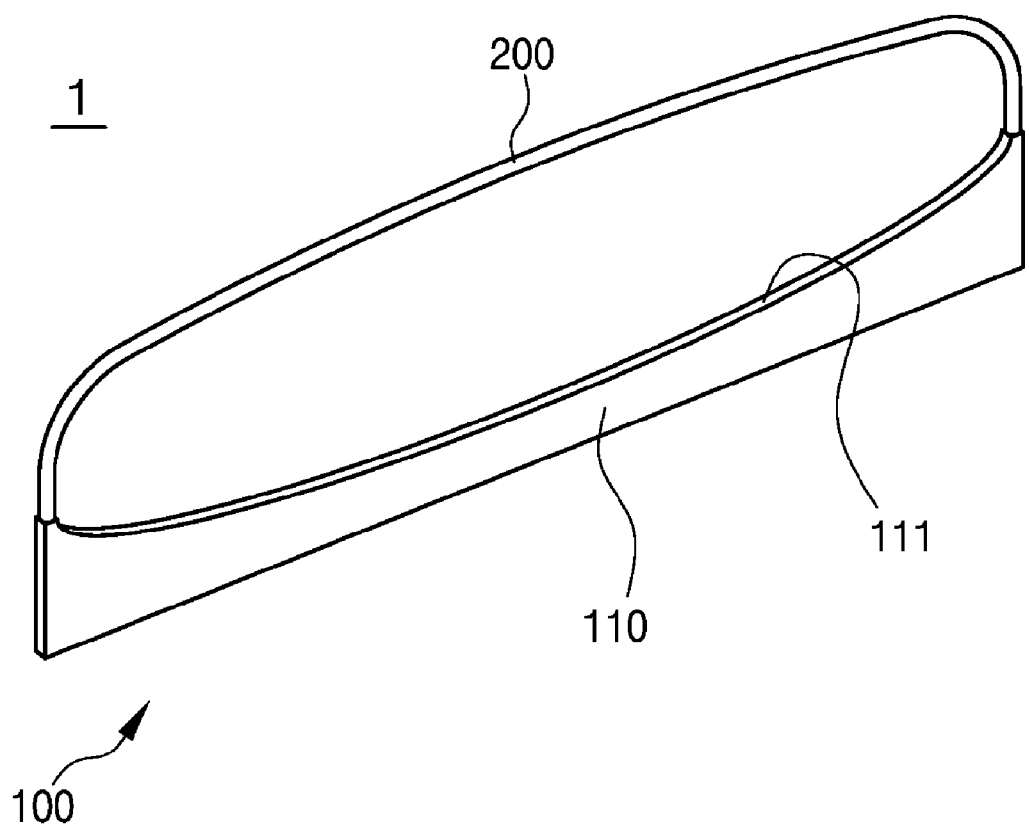
FIG. 3 is a perspective view of another belt loop for women's clothes in accordance with the first embodiment of the present invention.
Figure 4:
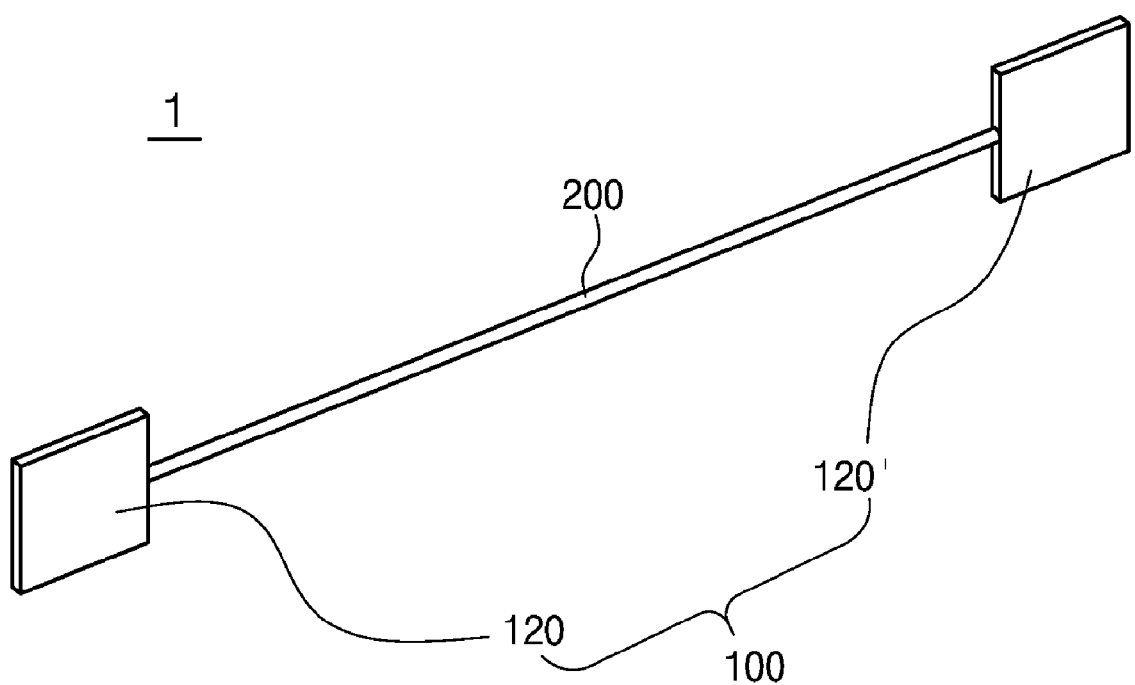
FIG. 4 is a perspective view of a belt loop for women's clothes in accordance with a second embodiment of the present invention.
Figure 5:
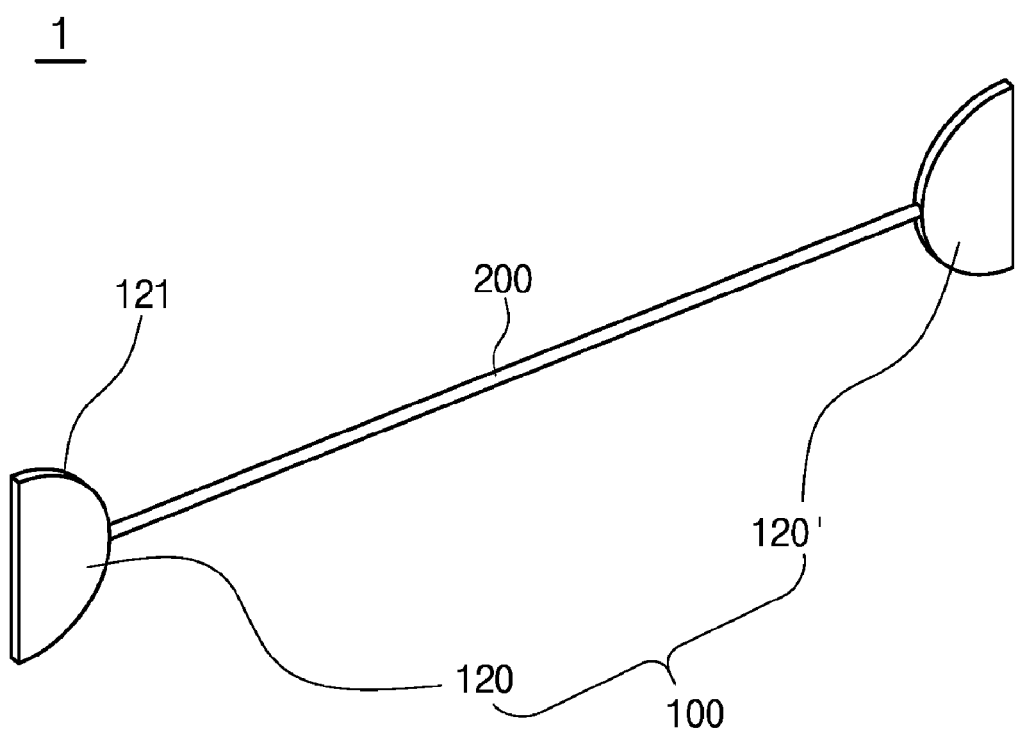
FIG. 5 is a perspective view of another belt loop for women's clothes in accordance with the second embodiment of the present invention.

FIG. 2 is a perspective view of a belt loop for women's clothes in accordance with a first embodiment of the present invention, FIG. 3 is a perspective view of another belt loop for women's clothes in accordance with the first embodiment of the present invention, FIG. 4 is a perspective view of a belt loop for women's clothes in accordance with a second embodiment of the present invention, and FIG. 5 is a perspective view of another belt loop for women's clothes in accordance with the second embodiment of the present invention.

As shown in FIGS. 2 to 5, a belt loop for women's clothes 1 in accordance with the present invention includes a piece of cloth for sewing 110 and a loop 200.

The piece of cloth for sewing 110 is sewn together with a front part and a back part of clothes (not shown) when the front part and the back part are backstitched, and may be formed of a thin fiber material which is not torn and prevents deformation of the external appearance of the clothes during a process of backstitching the front part and the back part of the clothes.

The loop 200 is configured to actually form a hole through which a belt (not shown) may pass when a wearer wears the belt on the clothes, and both ends of the loop 200 are sewn on or integrally formed with both sides of the piece of cloth for sewing 110.

That is, the loop 200 is formed of twisted yarn acquired by twisting two or more strands of yarn, and a yarn twisting method is not limited to a specific method and may employ various methods. However, the drawings of the present invention exemplarily illustrate the same method as a general hair braiding method.

Further, in the configuration of the belt loop 1 of the present invention, a connection method between the piece of cloth for sewing 110 and the loop 200 is also not limited to a specific method and may employ various methods.

Hereinafter, a belt loop for women's clothes in accordance with the first embodiment will be described, the belt loop 1 may include a loop-integrated piece of cloth for sewing 100 into which the piece of cloth for sewing 110 and the loop 200 are integrated.

Both ends of the loop 200 connected to the piece of cloth for sewing 110 are connected to both ends of the loop-integrated piece of cloth for sewing 100 in the length direction so that a belt may pass between the piece of cloth for sewing 110 and the loop 200.

Otherwise, if both ends of the loop 200 are sewn on both sides of the piece of cloth for sewing 110, both ends of the loop 200 may be connected to eccentric positions, particularly, eccentric tips of both ends of the piece of cloth for sewing 110, leaning to one side of the piece of cloth for sewing 110 in the length direction.

Further, another belt loop for women's clothes in accordance with the first embodiment will be described, as shown in FIG. 3, a piece of cloth for sewing 110 has a rectangular shape, and an exposure prevention groove 111 which is concave may be formed in the longitudinal direction of the piece of cloth for sewing 110, to which ends of a loop 200 are connected, between both ends of the loop 200.

The exposure prevention groove 111 serves to minimize a part of the tip of the piece of cloth for sewing 110, which is exposed to the outside of clothes, during a process of sewing the piece of cloth for sewing 110 together with the clothes and to expose the loop alone to the outside of the clothes. In order to minimize exposure of the tip of the piece of cloth for sewing 110 of connected to the loop to the outside due to poor work or a mistake of the sewer during backstitching, the middle portion of the surface of the piece of cloth for sewing 110 connected to the loop 200 is concave.

Further, a belt loop for women's clothes in accordance with the second embodiment will be described, a piece of cloth for sewing 110 may include a pair of separate pieces of cloth for sewing 120 and 120' which are provided at both sides, as shown in FIG. 4.

The separate pieces of cloth for sewing 120 and 120' are arranged to be coplanar with each other such that sides thereof are opposite to each other and, in this embodiment of the present invention, have a rectangular shape.

Further, both ends of the loop 200 are connected to the separate pieces of cloth for sewing 120 and 120', respectively.

Here, both ends of the loop 200 may be located at positions close to the tips of the opposite sides of the respective separate pieces of cloth for sewing 120 and 120'.

Further, another belt loop for women's clothes in accordance with the second embodiment will be described, as shown in FIG. 5, separate pieces of cloth for sewing 120 and 120' provided in a pair may include semicircular protruding parts 121 having a semicircular shape and curved to have a designated curvature at opposite sides thereof. Since, if the separate pieces of cloth for sewing 120 and 120' have a rectangular shape, the tips of the pieces of cloth for sewing may be exposed to the outside of a seam allowance line of clothes, contacting the loop during a process of sewing the separate pieces of cloth for sewing 120 and 120' together with the clothes, the semicircular protruding parts 121 serve to minimize parts of the pieces of cloth for sewing which may be exposed to the outside and thus to prevent the parts of the pieces of cloth for sewing from being exposed to the outside of the clothes due to poor work.

Hereinafter, a method of sewing a belt loop for women's clothes on clothes in accordance with the present invention will be descried in detail referring to the accompanying drawings.

Figure 6:
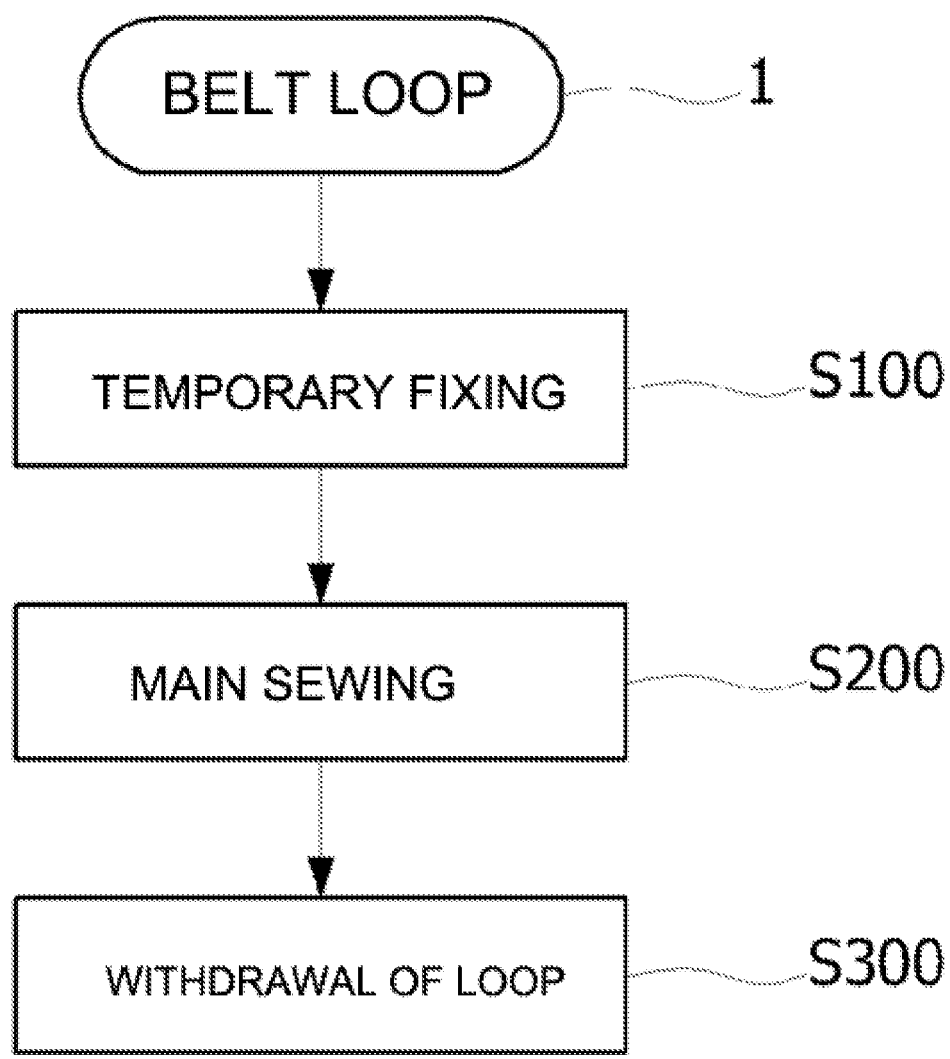
FIG. 6 is a flowchart illustrating a method for sewing a belt loop for women's clothes in accordance with the present invention.

FIG. 6 is a flowchart illustrating a method for sewing a belt loop for women's clothes in accordance with the present invention.

As shown in FIG. 6, the method in accordance with the present invention may include performing temporary fixing (S100), performing main sewing (S200) and performing withdrawal of a loop (S300), and, if clothes include a front part and a back part, the method is executed during a process of backstitching to connect the front part and the back part.

Figure 7:
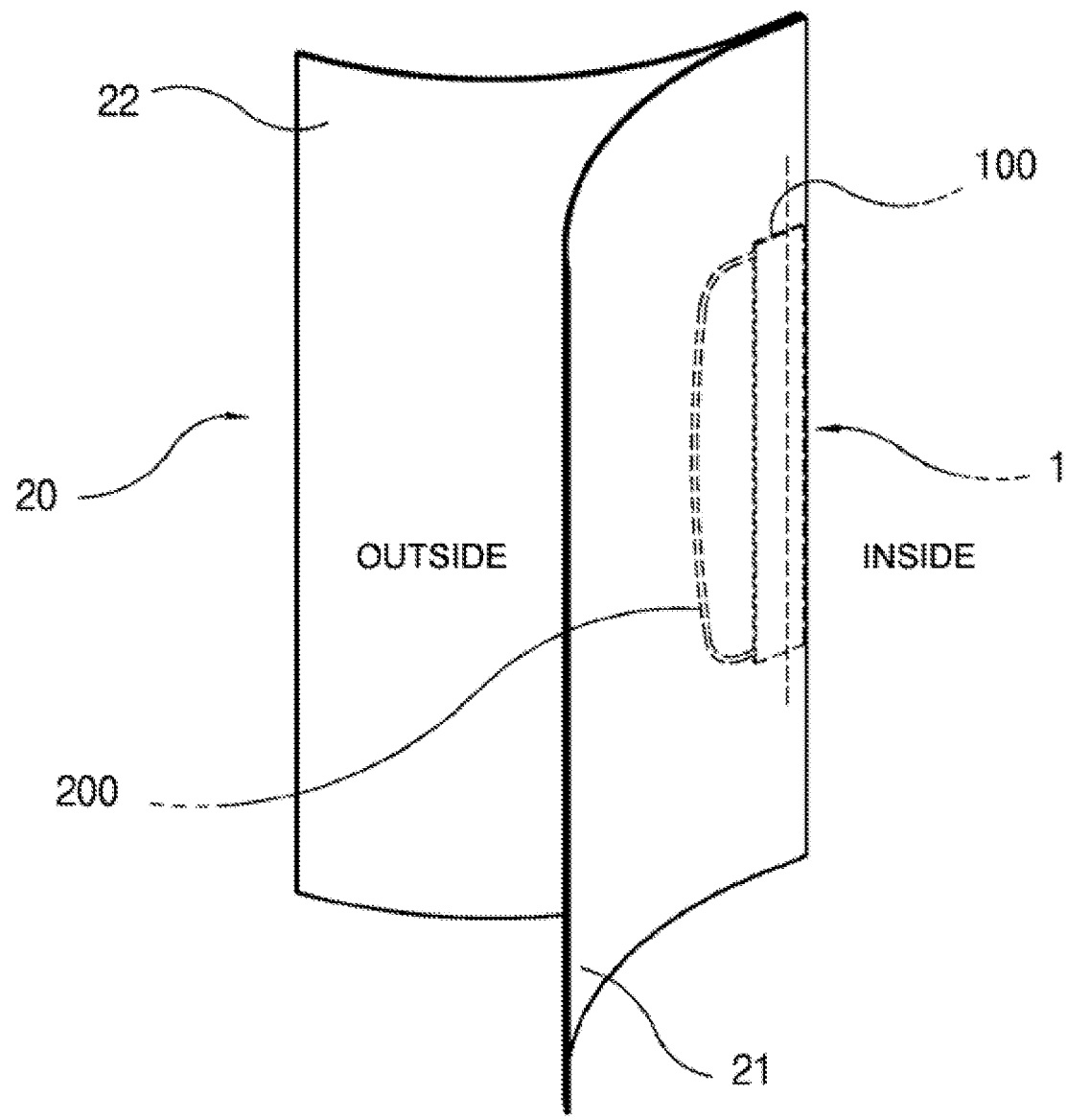
FIG. 7 is a schematic view illustrating temporary fixing in the method in accordance with the present invention.

In temporary fixing (S100), as shown in FIG. 7, after a front part 21 and a back part of clothes 20 are overlapped such that outer surfaces thereof face each other, a piece of cloth for sewing of a belt loop 1 is sewn on a seam allowance of any one of the front part 21 and the back part 22 prior to a process of fixing the front part 21 and the back part 22 by backstitching along a seam allowance line.

Here, the piece of cloth for sewing 110 of the belt loop 1 is backstitched to a seam allowance between the front part 21 and the back part 22 where backstitching is performed. Backstitching is performed such that a loop 200 of the belt loop 1 is located outside the seam allowance line so as to be exposed to the outside of the clothes 20 and the piece of cloth for sewing 110 is located at the seam allowance inside the clothes. After, during primary backstitching, the piece of cloth for sewing 110 is located along the seam allowance line of any one of the front part 21 and the back part 22 of the clothes 20, and then, a middle part of the piece of cloth for sewing 110 in the width direction is sewn in the length direction of the piece of cloth for sewing 110 so that the belt loop 1 is temporarily fixed to the margin allowance, secondary backstitching may be performed.

That is, performing the temporary fixing by performing primary backstitching of the belt loop 1 to the seam allowance of the clothes 20 serves to fix the position of the piece of cloth for sewing 110 during the backstitching process, and sewing is finished in secondary backstitching which is performed immediately subsequent to primary backstitching.

Figure 8:
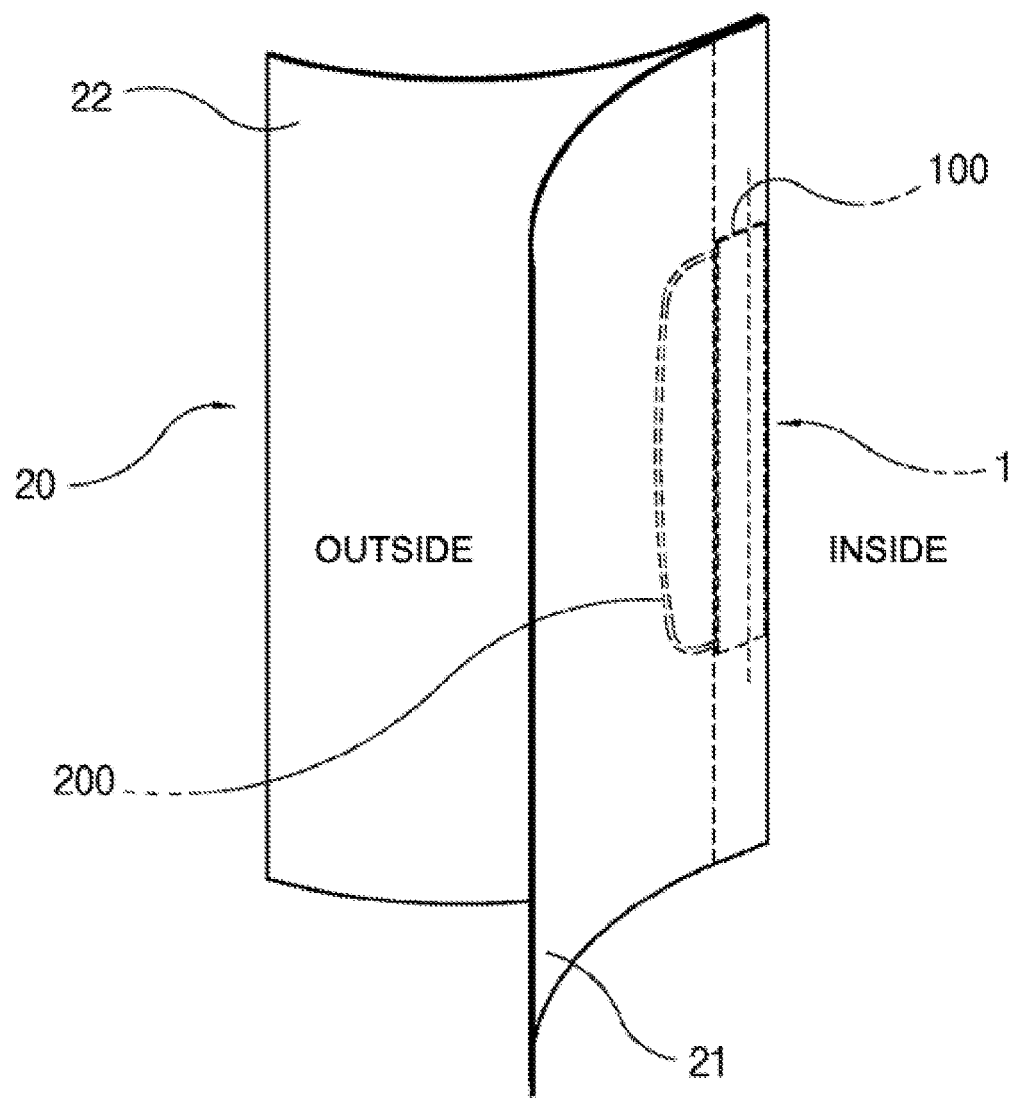
FIG. 8 is a schematic view illustrating main sewing in the method in accordance with the present invention.

That is, main sewing (S200), as shown in FIG. 8, is a process for completely fixing the belt loop 1 together with secondary backstitching of the clothes 20 under the condition that the piece of cloth for sewing 110 is temporarily fixed to the seam allowance of the clothes 20 by primary backstitching, and in this process, the front part 21 or the back part 22, to which the piece of cloth for sewing 110 is temporarily fixed, and the front part 21 or the back part 22, to which the piece of cloth for sewing 110 is not temporarily fixed, are overlapped such that the outer surfaces thereof face each other, and then secondary backstitching is performed along the seam allowance line.

Here, the loop 200 is exposed to the outside of the clothes 20 based on the seam allowance line, and, during primary backstitching, the piece of cloth for sewing 110 is located at the seam allowance in the length direction along the seam allowance line so as not to be exposed to the outside of the clothes, and then, the middle part of the piece of cloth for sewing 110 in the width direction is primarily backstitched in the length direction. Thereafter, under the condition that the front part and the back part are overlapped such that the outer surfaces thereof face each other, secondary backstitching is performed along the seam allowance line so that the piece of cloth for sewing 110 is located inside the clothes based on a secondary backstitching line so as not to be exposed to the outside of the clothes.

That is, the belt loop 1 is fixed to the clothes 20 during the secondary backstitching process of the clothes 20 so that only the loop is exposed to the outside of the clothes.

Figure 9:
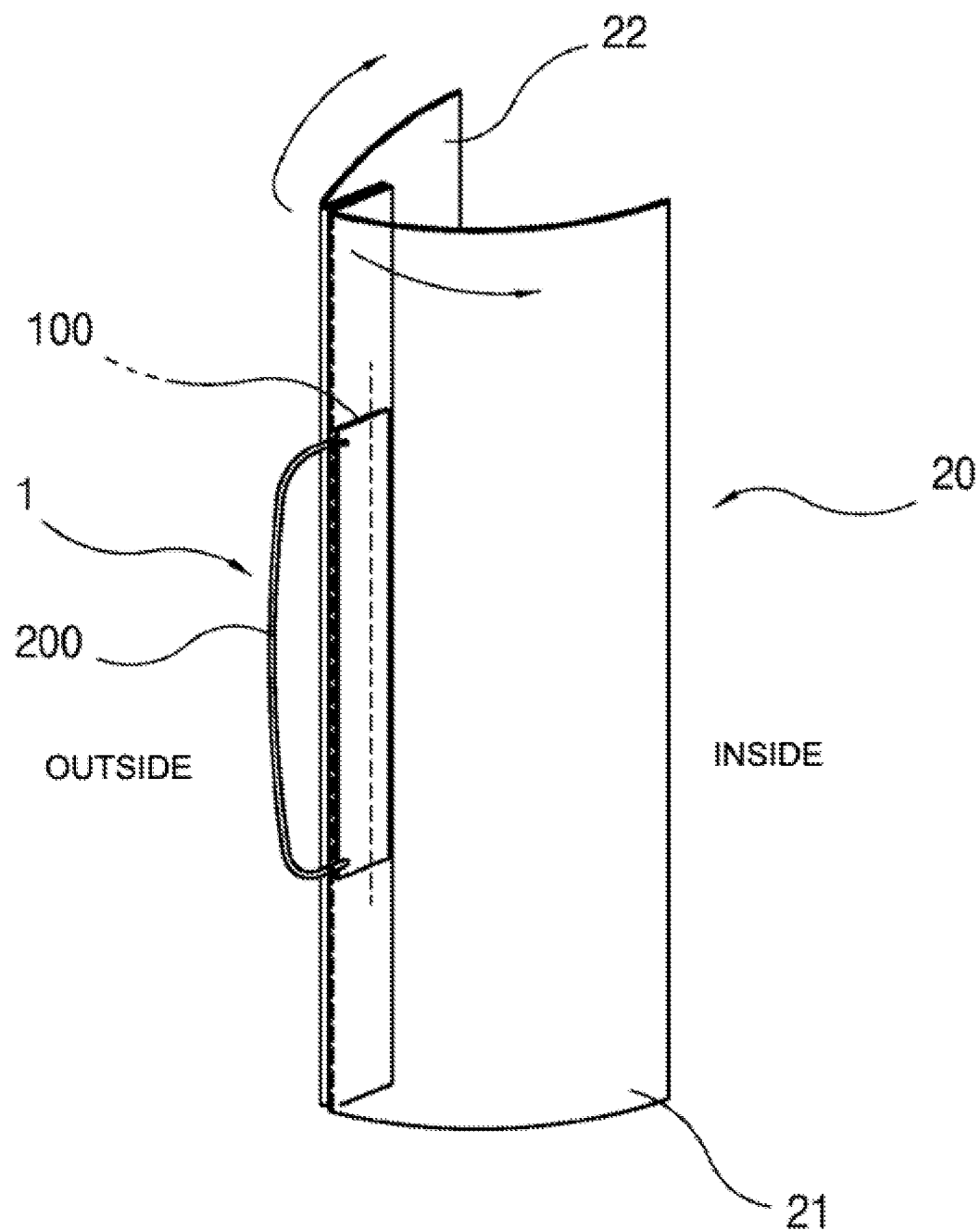
FIG. 9 is a schematic view illustrating withdrawal of a loop in the method in accordance with the present invention.

Thereafter, in withdrawal of the loop (S300), as shown in FIG. 9, the clothes are turned inside out under the condition that backstitching of the front part 21 and the back part 22 of the clothes 20 is performed, and the loop 200 of the belt loop 1 is withdrawn to the outside by turning the front part 21 and the back part 22 inside out.

In applying the sewing method in accordance with the present invention, clothes generally include a front part and a back part which are separately prepared, and the clothes are manufactured by preparing the front part and the back part, each of which is integrally formed, and connecting the front part and the back part, or preparing the front part and the back part, at least one of which is separated into upper and lower regions, and connecting the upper and lower regions of the front and back parts through backstitching, depending on designs.

Therefore, when the sewing method in accordance with the present invention is applied to clothes having a structure in which upper and lower regions of each of the front part 21 and the back part 22 are integrally formed, as shown in FIGS. 7 to 9, the piece of cloth for sewing 110 having a rectangular shape and integrated with the loop shown in FIGS. 2 and 3 may be used as the piece of cloth for sewing 110 of the belt loop 1, and be sewn during a process for backstitching the front part 21 and the back part 22.

Figure 10:
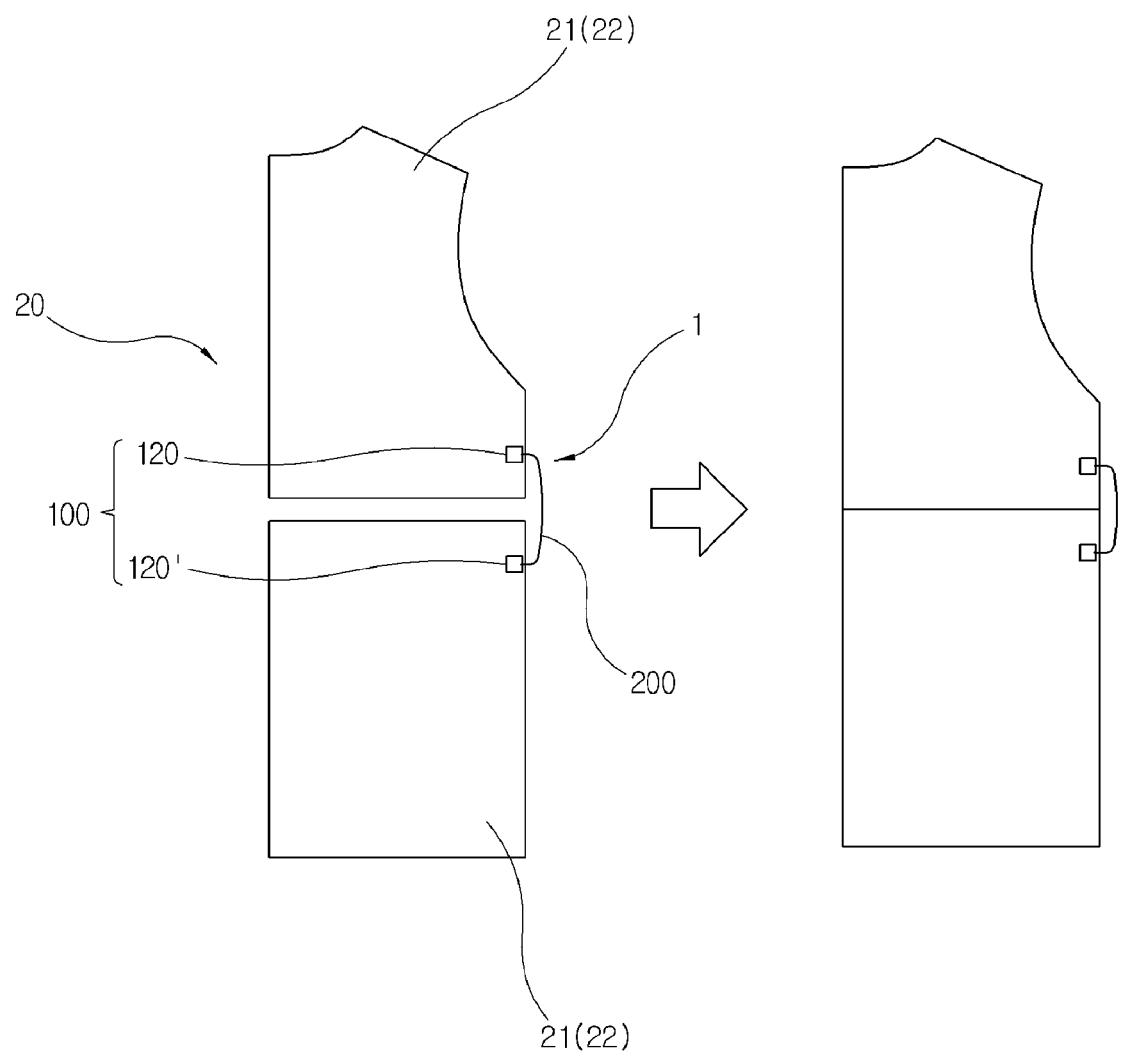
FIG. 10 is a view illustrating a method for sewing a belt loop for women's clothes in accordance with another embodiment of the present invention.

Further, when the sewing method in accordance with the present invention is applied to clothes 20 having a structure in which any one or both of the front part 21 and the back part 22 are separated into upper and lower regions, as shown in FIG. 10, a pair of the separate pieces of cloth for sewing 120 and 120' shown in FIGS. 4 and 5 may be used as the piece of cloth for sewing 110 of the belt loop 1.

Here, one separate piece of cloth for sewing 120 is sewn on a seam allowance during the process for backstitching the upper regions of the front part 21 and the back part 22, the other separate piece of cloth for sewing 120' is sewn on a seam allowance during the process for backstitching the lower regions of the front part 21 and the back part 22, and thereafter, the upper and lower regions of the clothes 20 are connected by backstitching along a seam allowance line.

That is, if the piece of cloth for sewing 110 is applied to the clothes 20 separated into upper and lower regions, the piece of cloth for sewing 110 may be exposed to the outside through a backstitching part during the process for backstitching the upper and lower regions of the clothes 20, and thus, in this case, a pair of the separate pieces of cloth for sewing 120 and 120' may be used.

As described above, in the belt loop for women's clothes and the method for sewing the same in accordance with the present invention, the belt loop may have a structure in which the piece of cloth for sewing and the loop are integrated in advance and be sewn together with front and back parts of clothes during the process for backstitching the front and back parts of the clothes, and thus a process for forming a belt loop through separate manual tasks is not required.

Figure 11:
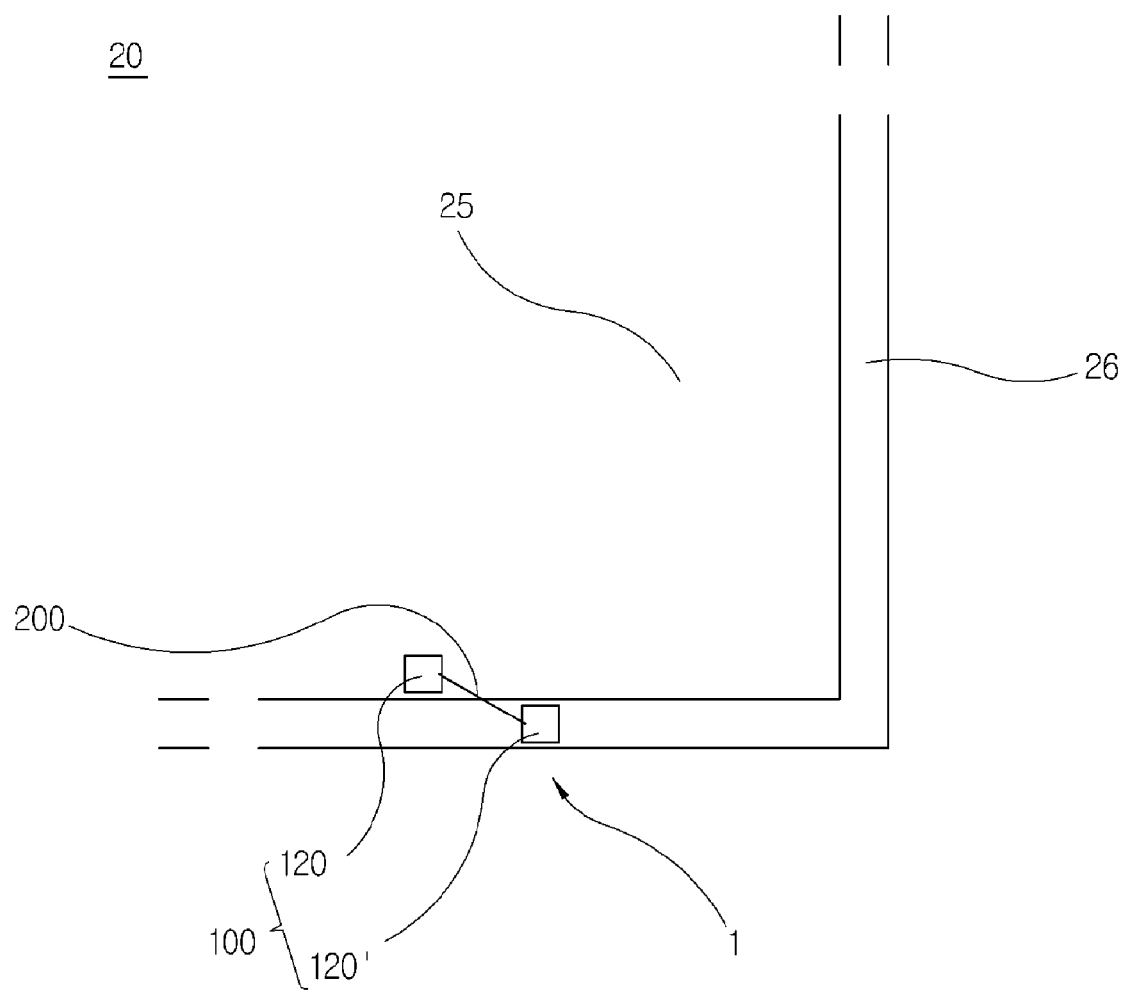
FIG. 11 is a view illustrating a use state of a belt loop for women's clothes in accordance with another embodiment of the present invention.

In applying the belt loop for women's clothes in accordance with the present invention, the belt loop may have various other functions in addition to the function of a belt loop, and, for example, when the belt loop for women's clothes in accordance with the present invention is applied to women's clothes 20 including an inner lining 25 and an outer cover 26, such as a skirt, as shown in FIG. 11, the belt loop 1 including a pair of the separate pieces of cloth for sewing 120 and 120' shown in FIGS. 4 and 5 may be applied. Here, one separate piece of cloth for sewing 120 may be sewn on the inner lining 25, and the other separate piece of cloth for sewing 120' may be sewn on the outer cover 26.

When the separate pieces of cloth for sewing 120 and 120' are respectively sewn on the inner lining 25 and the outer cover 26, the inner lining 25 and the outer cover 26 are connected through the loop 200 connecting the separate pieces of cloth for sewing 120 and 120', mobility is given to a designated section (a length section of the loop) between the inner lining 25 and the outer cover 26 when the clothes are worn, and thus loss of a style of dressing due to excessive movement of the inner lining 25 and the outer cover 26 may be prevented and wearability of clothes may be improved.

That is, the belt loop for women's clothes 1 in accordance with the present invention is not limitedly used as a belt loop alone and may have various functions which may be applied to various clothes, thus having enhanced practicability.

DESCRIPTION OF REFERENCE NUMERALS AND MARKS

| | |
|---|---|
| 1: belt loop | 20: clothes |
| 21: front part | 22: back part |
| 25: inner lining | 26: outer cover |
| 100: loop-integrated piece of cloth for sewing | 110: piece of cloth for sewing |
| 111: exposure prevention groove | 120, 120': separate pieces of cloth for sewing |
| 121: semicircular protruding part | 200: loop |
| S100: temporary fixing | S200: main sewing |
| S300: withdrawal of loop | |

The invention claimed is:

1. A belt loop for women's clothes, comprising:
   a piece of cloth for sewing sewn together with a front part and a back part of clothes when the front part and the back part are backstitched; and
   a loop connected to the both ends of the piece of cloth for sewing so that a belt may pass between the piece of cloth for sewing and the loop,
   wherein the loop is connected to both ends of the piece of cloth for sewing in a length direction and is formed of twisted yarn acquired by twisting at least two strands of yarn.

2. The belt loop for women's clothes according to claim 1, wherein an exposure preventive groove which is concave is formed at a side of the piece of cloth for sewing in the length direction, to which ends of the loop are connected to the both ends of the piece of cloth for sewing.

3. A belt loop for women's clothes, comprising:
   a piece of cloth for sewing sewn together with a front part and a back part of clothes when the front part and the back part are backstitched; and
   a loop connected to both ends of the piece of cloth for sewing so that a belt may pass between the piece of cloth for sewing and the loop,
   wherein the piece of cloth for sewing comprises a pair of separate pieces of cloth for sewing, and both ends of the loop are respectively connected to the separate pieces of cloth for sewing.

4. The belt loop for women's clothes according to claim 3, wherein the separate pieces of cloth for sewing respectively comprise semicircular protruding parts at opposite sides thereof, and the both ends of the loop are formed adjacent to tips of the semicircular protruding parts.

5. A method for sewing a belt loop for women's clothes having a piece of cloth for sewing sewn on clothes simultaneously with sewing of the clothes, and a loop provided with both ends connected to both ends of the piece of cloth for sewing, the method comprising:
   performing temporary bonding by performing primary backstitching of the piece of cloth for sewing on a seam allowance of any one of a front part and a rear part of the clothes such that the loop alone is located outside the clothes based on a seam allowance line and the piece of cloth for sewing is located at the seam allowance inside the clothes based on the seam allowance line;
   performing main sewing by performing secondary backstitching along the seam allowance line under a condition that the front part and a rear part of the clothes are overlapped such that outer surfaces thereof face each other, so as not to expose the piece of cloth for sewing to outside the clothes from a secondary backstitching line;
   performing withdrawal of the loop by turning the clothes, in which the front part and the rear part are backstitched, inside out so as to withdraw the loop to outside.

6. The method according to claim 5, wherein, in the performing the temporary bonding and in the performing the main sewing, if one or more of the front part and the rear part of the clothes are separated into upper and lower regions, the piece of cloth for sewing of the belt loop comprises a pair of separate pieces of cloth for sewing, both ends of the loop are respectively formed adjacent to tips of opposite sides of the respective separate pieces of cloth for sewing, one separate piece of cloth for sewing is sewn on an inner lining, and the other separate piece of cloth for sewing is sewn on an outer shell.

7. The method according to claim 5, wherein, in the performing the temporary bonding and in the performing the main sewing, if one or more of the front part and the rear part of the clothes are separated into upper and lower regions, the piece of cloth for sewing of the belt loop comprises a pair of separate pieces of cloth for sewing, both ends of the loop are respectively formed adjacent to tips of opposite sides of the respective separate pieces of cloth for sewing, one separate piece of cloth for sewing is sewn together with the upper regions of the front part and the rear part by backstitching, and the other separate piece of cloth for sewing is sewn together with the lower regions of the front part and the rear part by backstitching.

* * * * *